United States Patent [19]
Klaus et al.

[11] 4,355,988
[45] Oct. 26, 1982

[54] TRACK ROLLER FOR TRACK-LAYING VEHICLES

[75] Inventors: Helmuth Klaus, Hagen-Haspe; Heinz Lause, Recklinghausen; Hansjoachim Brunn, Damme, all of Fed. Rep. of Germany

[73] Assignee: Firma Intertractor Viehmann GmbH & Co., Fed. Rep. of Germany

[21] Appl. No.: 163,062

[22] Filed: Jun. 26, 1980

[30] Foreign Application Priority Data

Jul. 5, 1979 [DE] Fed. Rep. of Germany ....... 2927173

[51] Int. Cl.³ ............................................. B62D 55/00
[52] U.S. Cl. ........................................ 474/91; 308/20; 305/14; 474/198; 474/901
[58] Field of Search ...................... 305/14, 28; 308/20, 308/108, 95, 101, 187; 474/91, 198, 901

[56] References Cited
U.S. PATENT DOCUMENTS 3,515,446 6/1970 Maguire ................................. 308/20
3,866,985 2/1975 Whitehurst ........................... 308/20
3,869,931 3/1975 Boggs .................................. 474/901
3,945,693 3/1976 Booth et al. .......................... 305/14
4,152,031 5/1979 Maguire ............................... 305/14

Primary Examiner—Lenard A. Footland
Attorney, Agent, or Firm—Jacobs & Jacobs

[57] ABSTRACT

Track roller for track-laying vehicles such as excavators having a shaft, a roller body rotatably supported thereon, two caps for limiting relative axial movement of shaft and roller body, and end pieces for attaching the track roller to the frame. The shaft has at its center a relatively large diameter, laterally thereof, spaced axially from each other, two relatively wide cylindrical bearing surfaces of larger diameter and, on its sides, ends of reduced diameter with elastic packings at suitable places between the end pieces and the caps and between the caps and the roller body, and an antifriction metal washer arranged between shaft and caps for the feeding of oil to those packings requiring lubrication which is effected from the oil space arranged between the bearing surfaces of the shaft and serves as an oil reservoir.

4 Claims, 1 Drawing Figure

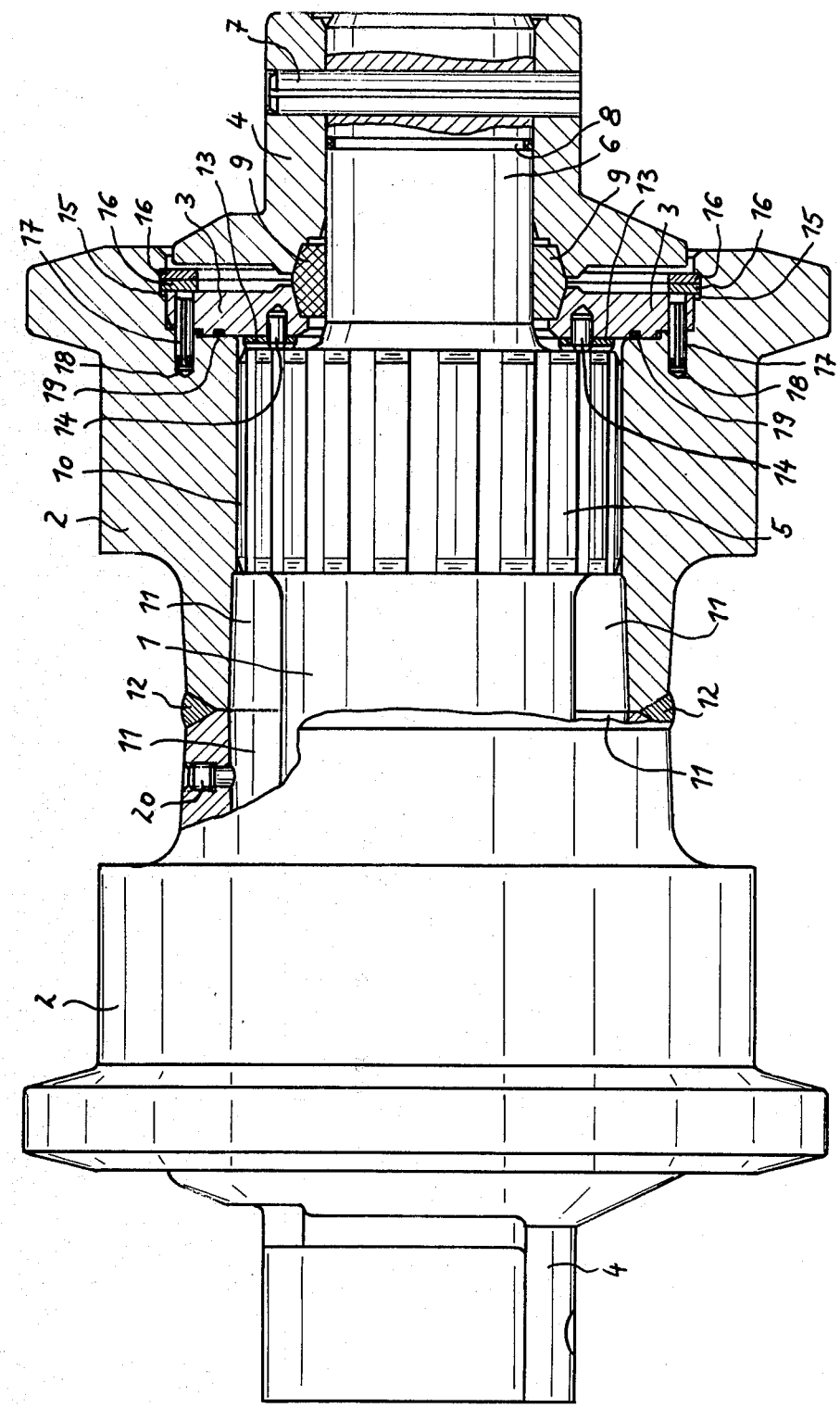

TRACK ROLLER FOR TRACK-LAYING VEHICLES

The present invention relates to a track roller for track-laying vehicles, particularly for excavators, consisting of a shaft, a roller body rotatably supported thereon, two caps which limit the axial relative movement of shaft and roller body, as well as two end pieces for the firm attachment of the track roller to the frame, the shaft having at its center a relatively large diameter, laterally thereof, spaced axially from each other, two relatively wide cylindrical bearing surfaces of large diameter and, on the two sides, ends of reduced diameter, elastic packings being provided furthermore at suitable places between shaft ends and end pieces, between the end pieces and the caps and between the caps and the roller body, and furthermore an antifriction metal washer is arranged between shaft and caps respectively, the feeding of oil to those packings which must be lubricated being effected from the oil space which is arranged between the bearing surfaces of the shaft and serves as oil reservoir.

Such rollers are known, for instance, from U.S. Pat. No. 3 866 985.

One essential disadvantage of these rollers, which makes them also unusable for track-laying vehicles of high speeds, is that while the oil space is formed to a slight extent by the shaft center itself, it is formed predominantly by a recess in the roller body. As a result, even at medium speeds, because of the centrifugal forces which occur, the oil collects in the radially outer recess of the roller body and is thus no longer available for lubrication. Another known track roller of the same type is known from German Unexamined Application for U.S. Pat. No. 2 037 168. In this case, an oil space is hollowed out only on the shaft and recesses in the roller body are avoided. However, this arrangement is disadvantageous since the path of the lubricant to the lubricating points which are furthest away is too long and the bearing width in the region of the shaft recess is so slight that upon idling or handing of the track bearing damage can occur.

The invention therefore is based on the task of creating a track roller of the above-indicated type which is suitable for higher vehicle speeds, while assuring sufficient lubrication of the packings, a uniform bearing width to be available over the entire extent of the shaft.

In order to achieve this purpose, the invention proposes that the roller body have a shaft-receiving opening which extends approximately uniformly and practically without steps over the entire width of the roller body, the plain bearings for the bearing surfaces of the shaft being arranged directly in the ends of the roller body.

By this development, the oil space is formed practically exclusively by the center of the shaft.

Even in the case of high centrifugal forces when the oil is thrown radially outward, good lubrication of the shaft packing is assured, the lubricant pressure increasing even automatically upon an increase in speed.

The feeding of oil to the lubricating points is possible without ports or boreholes through the plain bearing surfaces. Furthermore, the full bearing width is always available upon track sag and idling.

For reasons of manufacturing, it is advisable for the roller body, which is welded together from two identical lathe-cut parts, to be developed cylindrical in the region of the plain bearings and then widen conically slightly from there towards the center.

For the same reason it is intended to provide a small step between the end of the plain bearings and the starting point of the oil space.

If the feeding of oil from the oil space to the lubricating point should not be sufficient it is possible to provide the plain bearings with axially extending grooves which connected the oil space with the packing space.

The arrangement of the grooves can be effected in a very simple and inexpensive manner.

One illustrative embodiment of the invention is shown in the drawing and will be described in further detail below. The FIGURE shows a track roller in side view, partially cut away.

The track roller for excavators consists of a shaft 1, a roller body 2, two caps 3, and two end pieces 4.

The shaft 1 is stepped. Its central part is stepped down with respect to the bearing surfaces 5, in the same way as the shaft ends 6 to which the end pieces 4 are fastened by means of clamping sleeves 7 and sealed by means of O-ring 8 and packing set 9. The part 10 shows the plain bearing for the roller body 2, which bearing is lubricated by oil present in the oil space 11, in the same way as the packing set 9. The roller body 2 is composed of two identical lathe-cut halves welded together at 12.

For the mechanical connection of shaft 1 and roller body 2, the caps 3 are held in axially immovable manner, they being in each case arranged in an end-side recess in the roller body 2 in such a manner that they rest in part against the end surface of the roller body 2 and in part against the end surface of the shaft shoulder or bearing surfaces 5 of the shaft. Between the contact surfaces of shaft 1 and cap 3 there is inserted an antifriction metal washer 13 which is held by pins 14 in non-turnable manner relative to the cap 3 and is readily replaceable. The pins 14 are inserted through corresponding holes in the antifriction metal washer 13 into blind holes in the cap 3.

Laterally in front of and behind the plate of the drawing there are provided, at the end pieces 4, bearing lugs for the attachment to the frame of the end pieces 4 and thus of the roller.

For the attachment of the cap 3, an inner circumferential annular groove 14 is provided at a distance, corresponding to the thickness of the cap, from the cap resting-end surface of the trackroller body 2, into which groove one or more retaining rings 16 of spring steel (for instance, snap rings or clamping disks) can be inserted in such a manner that approximately half of their width extends out of the groove 15 and this protruding portion rests against the outer end surface of the cap 3.

In the region of the cap 3 which is covered by the retaining ring 16 there are provided holes through which twist-prevention pins 17 (dowel pins or the like) are inserted and introduced into corresponding blind holes 18 in the roller body 2.

The pins 17 are held in non-losable manner by the retaining ring 16 but can easily be replaced after the removal of said ring.

Between the facing flanks of roller body 2 and cap 3 an O-ring is inserted as packing 19 into an annular groove of the cap 3.

The shaft recess opening of the roller body 2 is of approximately uniform diameter over its entire width. The plain bearings 10 are arranged in the ends of the roller body 2.

The lubricating oil introduces through the oil inlet screw 20 into the oil space 11 is conducted via the plain bearing 10 and the antifriction bearing 13 to the shaft packing 9 and sees there to the necessary lubrication even if the roller is operating at considerable speed. In this connection even upon chain idling or sag the full bearing width of the plain bearing 10 is available.

The invention is particularly advantageous in combination with the applicants' "cap attachment" application filed on even date herewith under Ser. No. 163,061, which has the same priority date and the contents of which are hereby fully incorporated herein by reference.

We claim:

1. Track roller for excavators and other track-laying vehicles, consisting of a shaft, a roller body rotatably supported thereon, caps limiting the axial relative movement of shaft and roller body and end pieces axially spaced from each other for the firm attachment of the track roller to the frame, the shaft in its center having a relatively large diameter laterally thereof, relatively wide cylindrical bearing surfaces of larger diameter and on its sides ends of reduced diameter, elastic packings disposed at suitable locations between the shaft ends and the end pieces, between the end pieces and the caps, and between the caps and the roller body, an antifriction metal washer provided between the shaft and the caps, respectively, the feeding of oil to those packings which must be lubricated taking place from an oil space which is arranged between the bearing surfaces of the shaft and which serves as an oil reservoir, the roller body having a shaft-receiving opening which extends approximately uniformly over its entire width and is substantially free of steps, plain bearings for the bearing surfaces of the shaft being arranged directly in the ends of the roller body.

2. A track roller according to claim 1, wherein the roller body, which is welded together from two identical lathe-cut parts, is cylindrical in the region of the plain bearings and from there widens slightly conically towards the center.

3. A track roller according to claim 1, wherein a small shoulder is provided between the plain-bearing end and the starting point of the oil space.

4. A track roller according to claim 1, wherein the plain bearings are provided with axially extending grooves which connect the oil space with the packing space.

* * * * *